(12) United States Patent
Meyer

(10) Patent No.: US 9,962,039 B2
(45) Date of Patent: May 8, 2018

(54) CHOP RACK

(71) Applicant: Steve Meyer, Van Meter, IA (US)

(72) Inventor: Steve Meyer, Van Meter, IA (US)

( * ) Notice: Subject to any disclaimer, the term of this patent is extended or adjusted under 35 U.S.C. 154(b) by 0 days. days.

(21) Appl. No.: 14/833,587

(22) Filed: Aug. 24, 2015

(65) Prior Publication Data

US 2016/0058246 A1     Mar. 3, 2016

Related U.S. Application Data

(60) Provisional application No. 62/041,976, filed on Aug. 26, 2014.

(51) Int. Cl.
*A47J 37/06* (2006.01)
*A47J 43/18* (2006.01)

(52) U.S. Cl.
CPC .......... *A47J 43/18* (2013.01); *A47J 37/0694* (2013.01)

(58) Field of Classification Search
CPC ......... F16M 11/04; A47J 37/04; A47J 37/043; A47J 37/047; A47J 37/049; A47J 43/18
USPC ........ 126/9 B, 9 R, 25 A, 25 AA, 25 R, 265, 126/29, 38, 39 B, 41 A, 41 B; 211/85.4; 99/448, 449, 450; D7/402
See application file for complete search history.

(56) References Cited

U.S. PATENT DOCUMENTS

| | | | | |
|---|---|---|---|---|
| 86,923 A | * | 2/1869 | Isham | A47J 37/067 126/275 R |
| 446,855 A | * | 2/1891 | Earle | A47J 37/0694 211/153 |
| 527,252 A | * | 10/1894 | Stroud | A47J 27/04 126/337 R |
| 532,729 A | * | 1/1895 | Glassmeyer | A47J 37/106 99/345 |
| 1,862,010 A | * | 6/1932 | Ehrlich | A47G 23/06 108/106 |
| 2,006,385 A | * | 7/1935 | Dikeman | F24C 15/16 126/339 |
| 2,190,065 A | * | 2/1940 | Griffin | A47F 5/01 211/85.26 |

(Continued)

FOREIGN PATENT DOCUMENTS

FR     2541431     * 2/1983 .............. F24C 15/14

OTHER PUBLICATIONS

Oak & Cherry Smoked Pork Chops—The BBQ Brethren Forums. (Feb. 11, 2012). Retrieved Oct. 11, 2016, from http://www.bbq-brethren.com/forum/showthread.php?t=125925.*

*Primary Examiner* — Joshua E Rodden
(74) *Attorney, Agent, or Firm* — Zarley Law Firm, P.L.C.

(57) ABSTRACT

A chop rack that has a tray with a base and sidewalls. Attached and extending upwardly from the tray is a plurality of spaced-apart support frames. Received and positioned over the support frame is a top assembly. Meat is received between the support frames such that the meat is maintained in an upright position, which in some embodiments allows a bone portion of the meat to come into contact with the base of the tray. Alternatively, a chop rack is provided that has a first and second sidewall that each has a set of spaced-apart slats connected along their respective lower edges that adjustably and selectively interlock with one another to form a cooking surface that allows for fine-tuned heat adjustments. Additionally, a central portion of both sidewalls does not have a slat to form an opening in the cooking surface to allow heat through to create even cooking conditions.

8 Claims, 5 Drawing Sheets

(56) References Cited

U.S. PATENT DOCUMENTS

| | | | | |
|---|---|---|---|---|
| 2,212,207 A * | 8/1940 | Irwin | A47J 37/0694 248/175 |
| 2,316,620 A * | 4/1943 | Rees | A47J 37/0694 108/6 |
| 2,360,026 A | 10/1944 | Wall | |
| 2,376,640 A | 5/1945 | Wall et al. | |
| 2,503,795 A * | 4/1950 | Brown | A47J 37/0694 211/181.1 |
| 2,583,913 A * | 1/1952 | Weiterschan | A47J 43/18 248/505 |
| 2,847,932 A * | 8/1958 | More | A47J 37/041 126/30 |
| 2,900,482 A * | 8/1959 | Aylor | F24C 7/00 126/25 A |
| 2,959,165 A * | 11/1960 | Morris | A47J 37/0763 126/304 R |
| 3,289,571 A * | 12/1966 | Lewus | A47J 27/04 126/369 |
| 3,306,281 A * | 2/1967 | Hoebel | A47J 37/0763 126/25 R |
| 3,536,000 A * | 10/1970 | Whitehill | A47J 36/022 99/422 |
| 3,648,679 A * | 3/1972 | Quinn | A47J 37/0763 126/25 A |
| 3,691,937 A * | 9/1972 | Meek | A47J 37/049 99/340 |
| 3,828,759 A * | 8/1974 | Cooper | A47J 37/0763 126/25 R |
| 3,972,318 A * | 8/1976 | Lenoir | A47J 37/10 126/348 |
| 4,559,869 A * | 12/1985 | Hogan | A47J 37/0694 211/184 |
| 4,974,502 A * | 12/1990 | Murdock | A47J 37/0694 211/153 |
| 5,730,046 A * | 3/1998 | Battaglia | A47J 43/18 426/523 |
| 6,460,452 B1 * | 10/2002 | Hester | A47J 37/0688 99/347 |
| D609,961 S * | 2/2010 | Bodum | D7/354 |
| D624,360 S * | 9/2010 | Leavelle | D7/501 |
| D694,580 S | 12/2013 | Cloutier et al. | |
| 2009/0049995 A1 * | 2/2009 | St. Laurent | A47J 43/18 99/419 |
| 2010/0206291 A1 * | 8/2010 | Axinte | A47J 36/025 126/25 R |
| 2012/0216686 A1 * | 8/2012 | Panea | A47J 37/0713 99/450 |

* cited by examiner

CHOP RACK

CROSS REFERENCE TO RELATED APPLICATION

This application claims the benefit of U.S. Provisional Application No. 62/041,976 filed Aug. 26, 2014.

BACKGROUND OF THE INVENTION

This invention relates to a chop rack. More specifically and without limitation, this invention is directed towards a chop rack and method of using the same.

When cooking chops it is conventional to cook the chops with the bone side down. The reason behind this is that chops require a long and slow cook to become tender as well as to be evenly cooked. Although it is conventional to cook chops in this fashion it can be difficult to accomplish.

In particular, when cooking chops that are no longer on a rack and are separated it is difficult to position them bone side down. The difficulty arises in that the bone does not sufficiently stabilize the chops and during the cooking process the chops fall over. Thus it is necessary to constantly check on the chops to ensure that none have fallen over, which even if discovered can be too late to prevent uneven or undesirable cooking.

Controlling the temperature when cooking chops is another problem in the art. Conventionally, an individual must expose chops to a heat sort in a uniform fashion, thereby severely limiting the control the individual has over the heat source, especially in the case of fire. Thus there is a need in the art to control the exposure of a chop to a heat source, namely fire, to control the exposure of the chop to direct heat and to otherwise disperse the heat uniformly for a superior cook.

Thus it is a primary object of the invention to provide a chop rack that improves upon the state of the art.

Another object of the invention is to provide a chop rack that allows for simple bone down cooking.

Yet another object of the invention is to provide a chop rack that is simple to use.

Another object of the invention is to provide a chop rack that does not need supervision.

Yet another object of the invention is to provide a chop rack that is durable.

Another object of the invention is to provide a chop rack that has an intuitive design.

These and other objects, features, or advantages of the present invention will become apparent from the specification and claims.

SUMMARY OF THE INVENTION

A chop rack that has a tray with a base and sidewalls. Attached and extending upwardly from the tray is a plurality of spaced-apart support frames. Received and positioned over the support frame is a top assembly. Meat is received between the support frames such that the meat is maintained in an upright position, which in some embodiments allows a bone portion of the meat to come into contact with the base of the tray. Alternatively, a chop rack is provided that has a first and second sidewall that each has a set of spaced-apart slats connected along their respective lower edges that adjustably and selectively interlock with one another to form a cooking surface that allows for fine-tuned heat adjustments. Additionally, a central portion of both sidewalls does not have a slat to form an opening in the cooking surface to allow heat through to create even cooking conditions.

DETAILED DESCRIPTION OF THE PREFERRED EMBODIMENTS

Figure 1:
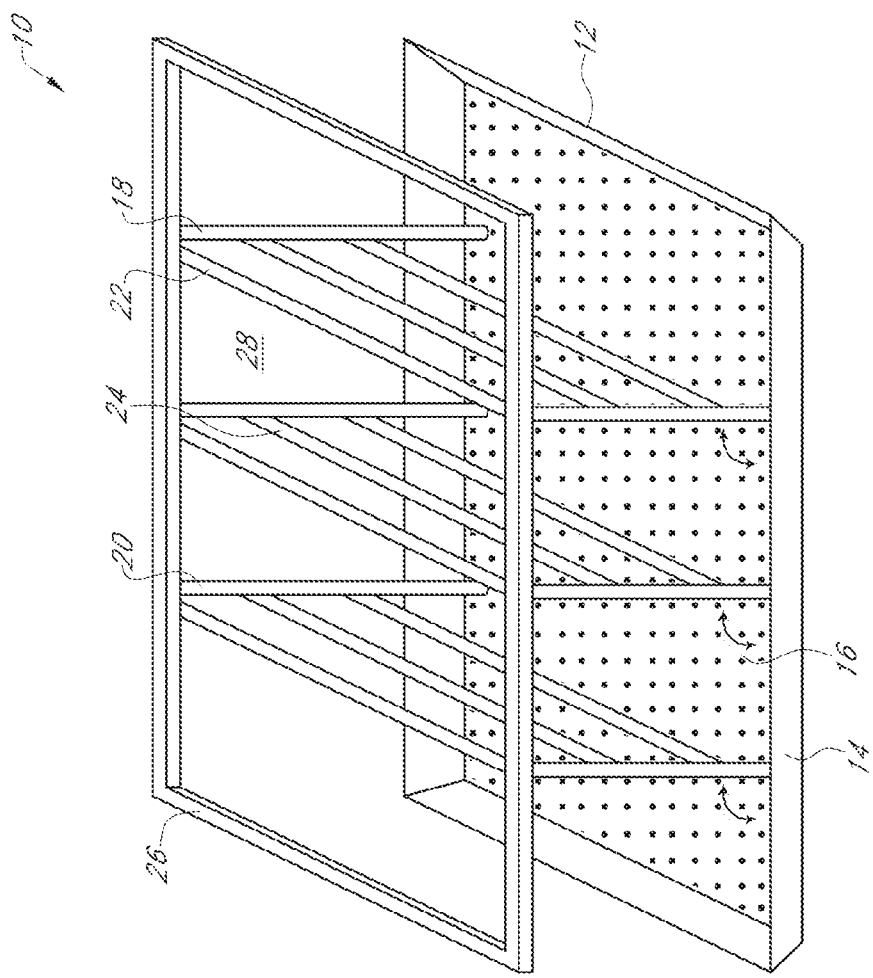
FIG. 1 is a perspective view of a chop rack.
Figure 2:
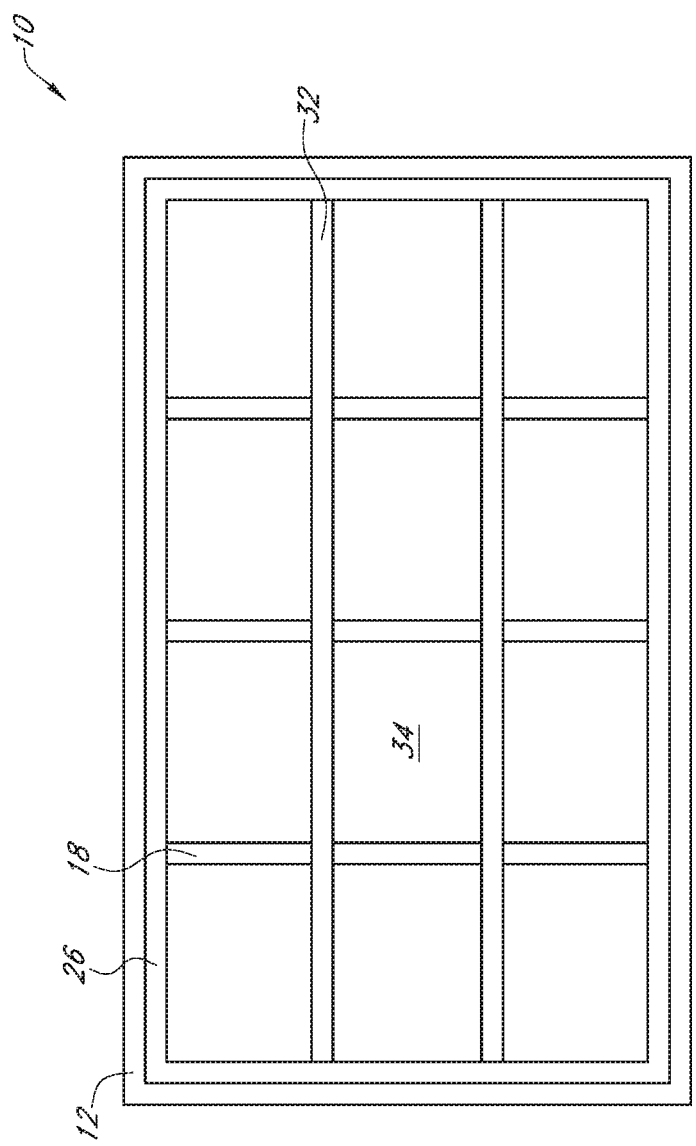
FIG. 2 is a top view of a chop rack.
Figure 3:
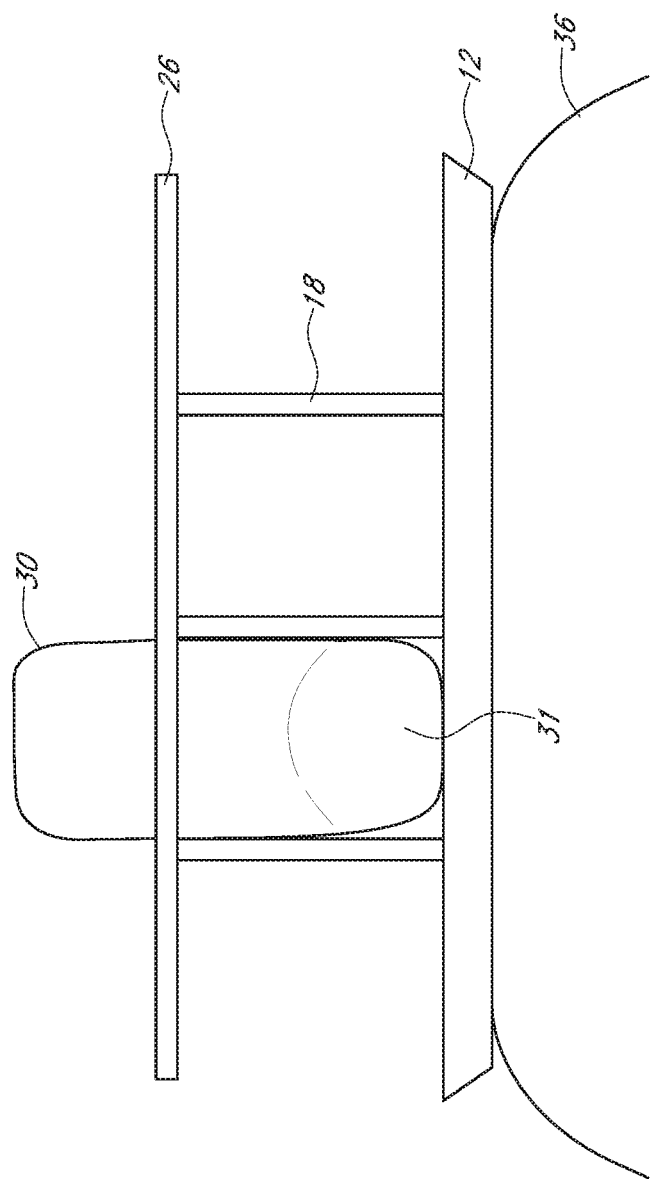
FIG. 3 is a side view of chop rack.
Figure 4:
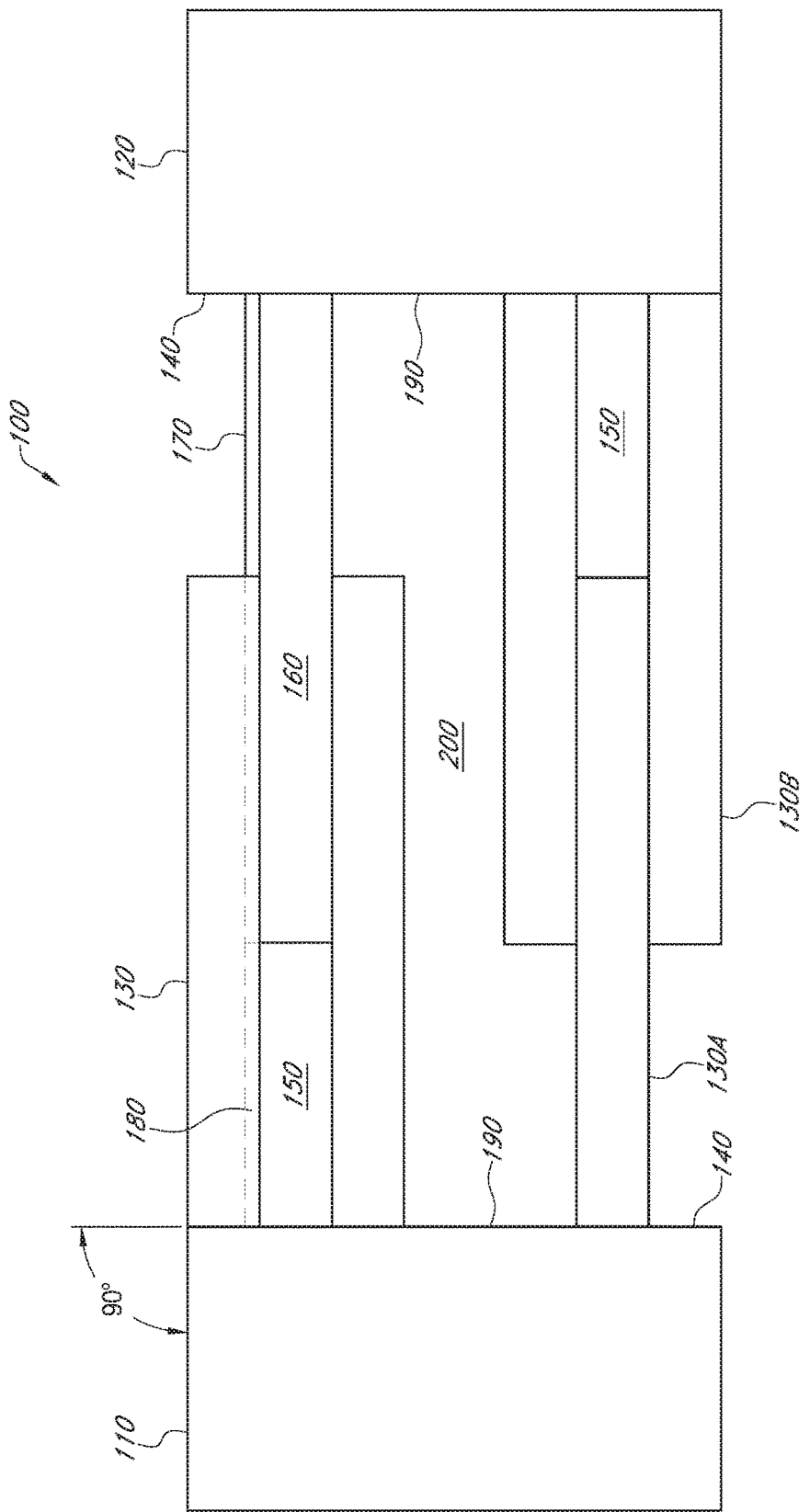
FIG. 4 is a top view of a chop rack.
Figure 5:
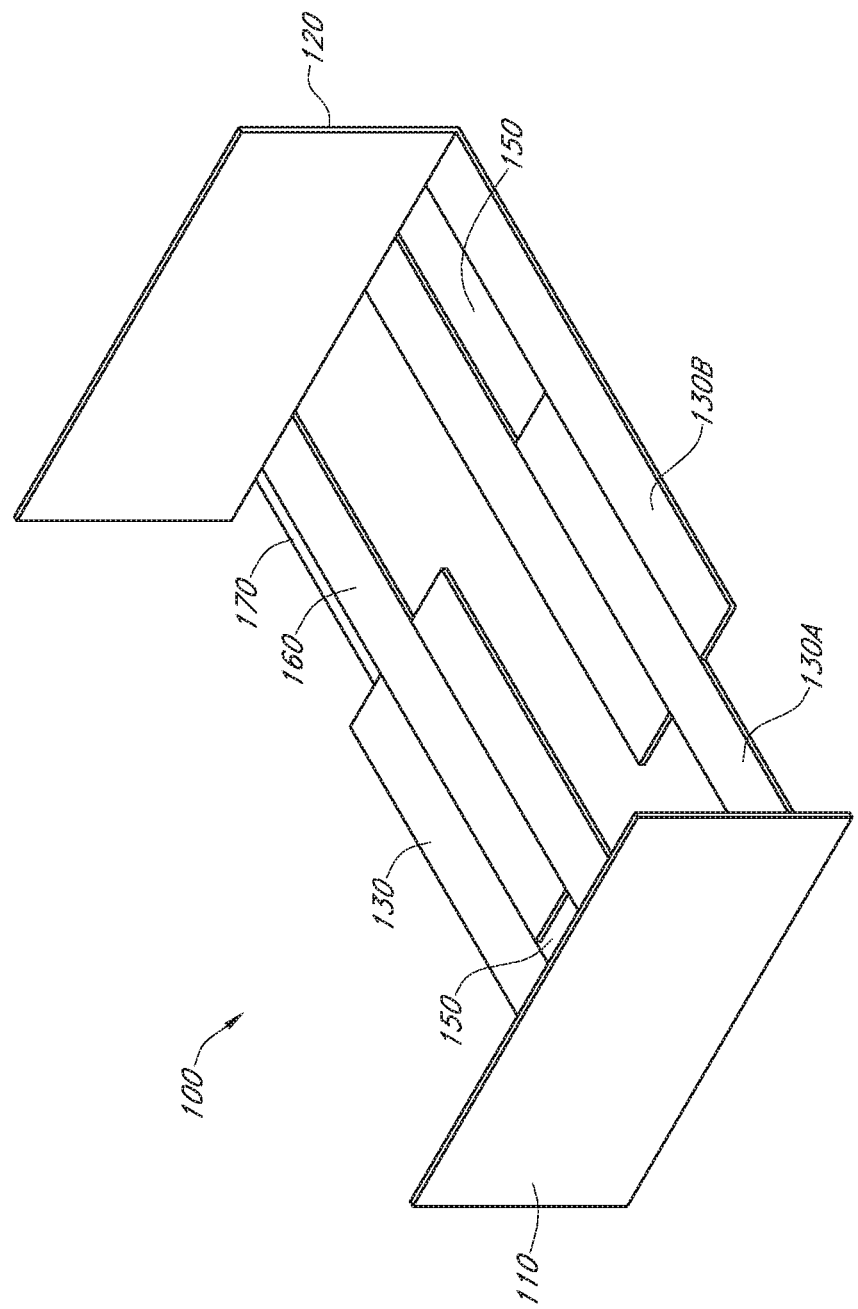
FIG. 5 is a perspective view of a chop rack.

With reference to the figures, a chop rack 10 is presented. The chop rack 10 has a tray 12 having a plurality of sidewalls 14 that slope outwardly. The tray 12 has a perforated base 16 but in other embodiments has slots, slits, or other openings to allow grease to pass through the tray 12. The tray 12 can be made of any heat resistant material. In an alternative arrangement, the tray 12 is simply a base 16 without sides 14. In yet another arrangement, the base 16 is not perforated but is instead solid.

Attached to and extending upward from the tray 12 are a plurality of support frames 18. The support frames 18 have a pair of frame sides 20 and a top 22. In the embodiment shown, the frame sides 20 and top 22 are made of metal rods, however they may also be metal sheets. Extending between the frame sides 20 are a plurality of support rods 24.

The support frames 18 are spaced closely together. In the arrangement shown, the support frames 18 are spaced such that they would accommodate a normal sized chop. In yet another arrangement the support frames 18 are pivotally attached to the tray 12, such that the support frames 18 can be laid down in the tray 12 when then the chop rack 10 is not in use.

A top assembly 26 is positioned over and received at the top of the support frames 18. Alternatively, the top assembly 26 is hingedly connected at one end of the chop rack 10. In one arrangement, the top assembly 26 is sized and shaped to fit around the plurality of support frames 18 with the central opening 28. An advantage of this arrangement is that it allows a meat product 30, such as a chop, to be positioned in between two support frames 18 and extends above the top 22 of the support frame 18 as well as the top assembly 26.

In alternative arrangements the top assembly 26 has at least one divider 32 that runs perpendicular to each of the support frames 18. In this arrangement a meat product 30 can be placed in a compartment 34 between the pair of support frames 18 and prevented from shifting to touch the other meat products 30 in other compartments 34. In this way, the entire exterior of the meat products 30 are exposed, while being prevented from contacting other meat products 30 or surfaces. In this embodiment or any other, the support frames 18, top assembly 26, and divider 32 are made of G5 wire to add additional rigidity, durability, and strength to the chop rack 10 while limiting costs.

In Operation: An individual sears both sides of one or more meat products 30. Then the individual places the chop rack 10 on a heat source 36 with the base 16 of the tray 12 in contact with the heat source 36. Next, the individual places the seared meat products 30 between pairs of support frames 18. Preferably, the individual places the meat product 30 with a bone 31 of the meat product 30 coming into contact with the base 16 of the tray 12. In this way, the meat product's 30 upright position is maintained.

After the meat products 30 are positioned between the support frames 18, the individual places the top assembly 26 over the support frames 18 to keep them in place.

While cooking, the meat product 30 is held in place with the bone of the meat product 30 closest to the heat source to provide an even cook. While cooking any grease that is formed passes through the perforated base 16 to prevent the hot grease from offsetting the cooking process. Additionally, the sloped sides 14 of the tray 12 prevent grease from spattering off the meat product 30 and harming anyone.

In an alternative embodiment, a chop rack 100 has a first sidewall 110 and a second sidewall 120. In one embodiment, the first sidewall 110 and the second sidewall 120 are flat planar sheets of metal, such as G5 or a food grade metal. In one arrangement the first sidewall 110 and second sidewall 120 measure 4 inches tall and 7.5 inches long. In another embodiment, the length is 8 inches. Connected to the first sidewall 110 and the second sidewall 120 are a sets of slats 130A and 130B. In one arrangement the sets of slats 130A and 130B are 9 inches long and 1 inch wide.

In one arrangement, the sets of slats 130A and 130B are rotatably and hingedly connected to a lower edge 140 of the first sidewall 110 and the second sidewall 120. In such an arrangement, the first sidewall 110 and second sidewall 120 can be laid flat with the sets of slats 130A and 130B when not in use for easy storage. When in use, the sets of slats 130A and 130B are rotated to a perpendicular position in respective relation to the first sidewall 110 and the second sidewall 120, such that the slats 130A attached to the first sidewall 110 extend away from the first sidewall 110 and towards the second sidewall and the slats 130B attached to the second sidewall 120 extend away from the second sidewall 120 and towards the first sidewall 110.

In an alternative arrangement, the sets of slats 130A and 130B are in a fixed perpendicular connection with the lower edge 140 of the first sidewall 110 and the second sidewall 120. The sets of slats 130A and 130B in this arrangement are positioned along the lower edge 140 of the first sidewall 110 and second sidewall 120 so they face one another.

The sets of slats 130A and 130B are connected at spaced intervals along the lower edge 140 of the first sidewall 110 and second sidewall 120 thereby leaving gaps 150 between the slats 140. In this way, the slats 130A connected to the first sidewall 110 are received within the gaps 150 of the second sidewall 120 and the slats 130B of the second sidewall 120 are received in the gaps 150 of the first sidewall 110 to form a cooking surface 160.

In another arrangement, one or more slats 130 have a tabbed side 170 and a slotted or grooved side 180. In this arrangement, the tabbed side 170 of slat 130A connected to the first sidewall 110 overlaps with the slotted side 180 of the slat 130B such that the slats 130 interlock with one another when slid together.

In one embodiment of the invention, a central portion 190 of the first sidewall 110 and the second 120 does not have a slat 130, thereby leaving an opening 200 when the opposing slats 130 are interlocked with one another. In this way, when the chop rack 100 is heated, heat is allowed to enter the chop rack 100 to allow for more even cooking and more properly cooked meat.

In one particular arrangement of the invention, the first sidewall 110 has three slats 130A connected at 0 to 1 inch, 3 to 4 inches, and 5.5 to 6.5 inches along the front edge 140. The second sidewall 120 has three slats 130B connected at 2 to 3 inches, 4.5 to 5.5 inches, and 6.5 to 7.5 inches. In this transposed arrangement, the slats 130 leave an opening 200 of 1.5 inches at the central portion 190. When the first sidewall 110 and second sidewall 120 have a length of 8 inches, the positions are adjusted respectively to leave an opening of 2 inches at the central portion. In other embodiments, the opening 200 can be larger or smaller. During use the user can lengthen and shorten the distance interlocking distance of the sets of slats 130A and 130B of the first sidewall 110 and the second sidewall 120 thereby lengthening and shortening the size of the gaps 150, which in turns allows greater control over how meat products 30 are cooked and a superior cooking process.

From the above discussion, it will be appreciate that the chop rack 10 and 100 presented improves upon the state of the art. Thus it is a primary objective of the invention is to provide a chop rack that improves upon the state of the art. That is, the chop rack presented allows for simple bone down cooking; is simple to use; does not need supervision; is durable; and has an intuitive design.

It will be appreciated by those skilled in the art that other various modifications could be made to the device without parting from the spirit and scope of this invention. All such modifications and changes fall within the scope of the claims that are intended to be covered thereby.

What is claimed is:

1. A chop rack comprising:
    a tray having a perforated base;
    more than two spaced-apart support frames attached to an inner side of the tray and extending upwardly from the perforated base along the inner side of the tray;
    a top assembly positioned over and received around a top of the support frames, having an opening such that a meat product vertically received through the opening and between the support frames extends above the support frames and the top assembly;
    wherein meat product is maintained in an upright position and contacts the perforated base of the tray; and
    wherein the support frames are pivotally attached to the tray.

2. The chop rack of claim 1 wherein sidewalls slope outwardly from the perforated base.

3. The chop rack of claim 1 further comprising the support frames have a pair of side frames and a plurality of support rods.

4. The chop rack of claim 1 further comprising the top assembly having at least one divider that runs perpendicular to the support frames, thereby forming at least one compartment between the support frames.

5. The chop rack assembly of claim 1 wherein the meat product is prevented from shifting to touch another meat product positioned on the chop rack.

6. The chop rack assembly of claim 1 wherein the chop rack does not require supervision during cooking.

7. A chop rack comprising:
    a tray having a base and a plurality of sidewalls that slope outwardly from the perforated base;
    a plurality of spaced-apart paired support frames attached to and extending upwardly from the tray adjacent to the sidewalls;
    a top assembly positioned over and received around a top of the support frames;
    the top assembly having at least one divider that runs perpendicular to the support frames, thereby forming at least one compartment between support frames;
    a meat product vertically received within the at least one compartment such that the meat product is maintained in an upright position with a bone of the meat product coming into contact with the base of the tray; and wherein the top assembly is hingedly connected to one end of the chop rack.

8. A chop rack comprising:

a tray having a base and a plurality of sidewalls;

a plurality of spaced-apart paired support frames attached to and extending upwardly from the tray adjacent to the sidewalls;

a top assembly positioned over and received around a top of the support frames;

the top assembly having at least one divider that runs perpendicular to the support frames, thereby forming at least one compartment between support frames;

a meat product vertically received within the at least one compartment such that the meat product is maintained in an upright position with a bone of the meat product coming into contact with the base of the tray; and wherein the support frames rotate downwardly into the tray toward the base of the tray when the chop rack is not in use.

\* \* \* \* \*